United States Patent
Cuomo et al.

(10) Patent No.: US 6,530,840 B1
(45) Date of Patent: Mar. 11, 2003

(54) METHOD AND SYSTEM FOR AN OBJECT ARCHITECTURE FOR A MULTI-USER GAME LOBBY AND GAME SESSION

(75) Inventors: Gennaro A. Cuomo, Apex, NC (US); Binh Q. Nguyen, Cary, NC (US); Richard J. Redpath, Cary, NC (US); Sandeep Kishan Singhal, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 900 days.

(21) Appl. No.: 08/832,430

(22) Filed: Apr. 2, 1997

(51) Int. Cl.$^7$ ................................................ A63F 13/00
(52) U.S. Cl. ...................................................... 463/42
(58) Field of Search ................... 463/41, 42; 364/410.1; 395/200.5

(56) References Cited

U.S. PATENT DOCUMENTS

| | | | | |
|---|---|---|---|---|
| 5,083,800 A | * | 1/1992 | Lockton | 273/439 |
| 5,558,339 A | * | 9/1996 | Perlman | 463/42 |
| 5,586,257 A | * | 12/1996 | Perlman | 463/42 |
| 5,668,950 A | * | 9/1997 | Kikuchi | 395/200.47 |
| 5,828,843 A | * | 10/1998 | Grimm et al. | 398/200.58 |

FOREIGN PATENT DOCUMENTS

| | | | |
|---|---|---|---|
| EP | 0714684 | 6/1996 | ............. A63F/9/22 |
| WO | 9530465 | 11/1995 | ............. A63F/9/22 |
| WO | WO 97/10561 | 3/1997 | |
| WO | 9832507 | 7/1998 | ............. A63F/9/22 |

OTHER PUBLICATIONS

Somogyi, Stephan. "Microsoft and Apple put some elbow grease into game support." Digital Media, May 14, 1996. p. 3, lines 3–15.
Copy of UK Examination Report for corresponding application GB9806473.6.

* cited by examiner

Primary Examiner—Valencia Martin-Wallace
Assistant Examiner—John M Hotaling, II
(74) Attorney, Agent, or Firm—Myers Bigel Sibley & Sajovec, P.A.; A. Bruce Clay (57) ABSTRACT

A game lobby allows users to open a game with their name at a central place so that others may see and join that game. The user can set the criteria for starting this game, such as the number of players or start time, whichever comes first. This paradigm enables a platform-independent object model without the burden of multi-user communication management by the game developer. The object model enables the development of game lobby services by multiple vendors and allows games to freely operate with any of these lobby implementations.

18 Claims, 7 Drawing Sheets

METHOD AND SYSTEM FOR AN OBJECT ARCHITECTURE FOR A MULTI-USER GAME LOBBY AND GAME SESSION

FIELD OF THE INVENTION

This invention relates in general to computer software, and in particular to a method and system for providing an interface in a data processing system to a communication process which allows a server to scalably connect multiple users for a multi-user game. More particularly, the present invention relates to a method and system by which game developers can connect users to each other, create/join multi-user games, and enable inter-user communications in a scalable manner.

BACKGROUND OF THE INVENTION

Multi-user games such as "Quake," "Populous," and "MUDs" (Multiple User Dungeons) are proliferate and proprietary with client-server models. The creators of these games are faced with the task of managing multi-user communication which is typically well outside the primary game content or game developer's expertise. Corporations such as TEN (Total Entertainment Network) are trying to provide a high-level programming interface to achieve this communication goal for game creators. Many such companies are engaged in the competition to provide a simple interface which requires little or no knowledge of multi-user and network programming.

Prior art includes proprietary services that are provided on the Internet by private and publicly available companies such as TEN (Total Entertainment Network) and Microsoft Corporation. TEN's current implementation relies on the game developer to integrate the game with a proprietary lobby implementation to service users and allow multi-user games to be joined. Microsoft Corporation offers DirectPlay which encapsulates a COM object, thereby requiring the developer to run on Microsoft platforms and requiring the use of a Browser that supports ActiveX. The monolithic architecture of ActiveX dictates a complex programming interface.

The overall concept desired is to provide a game lobby in which users can open a game with their name at a central place so that others may see and join that game. The user can set the criteria for starting this game, such as the number of players or start time, whichever comes first. The present invention enables this paradigm through a platform-independent object model without the burden of multi-user communication management by the game developer. The object model enables the development of game lobby services by multiple vendors and allows games to freely operate with any of these lobby implementations.

SUMMARY OF THE INVENTION

The present invention relates to a method and system for providing a game lobby and game session for a game developer in a multi-user environment.

Another object of the invention is to provide a seamless object model to facilitate any multi-user game.

Another object of the invention is to provide a simple programming interface for a multi-user environment.

Yet another object of the subject invention is to provide scalability without restricting the use of the communication system within certain types of networks.

Still another object of the invention is a seamless configurable clustering of servers to optimally facilitate scalable user connections to create games and join games via a game lobby.

To achieve the foregoing objects and in accordance with the purpose of the invention, a method is provided of the invention as broadly described herein. These and other features, aspects, and advantages of the present invention will become better understood with reference to the following description, appended claims, and accompanying drawings.

BRIEF DESCRIPTION OF THE DRAWINGS

For a more complete understanding of the present invention and for further advantages thereof, reference is now made to the following Detailed Description taken in conjunction with the accompanying drawings, in which.

DETAILED DESCRIPTION OF THE INVENTION

Figure 1:
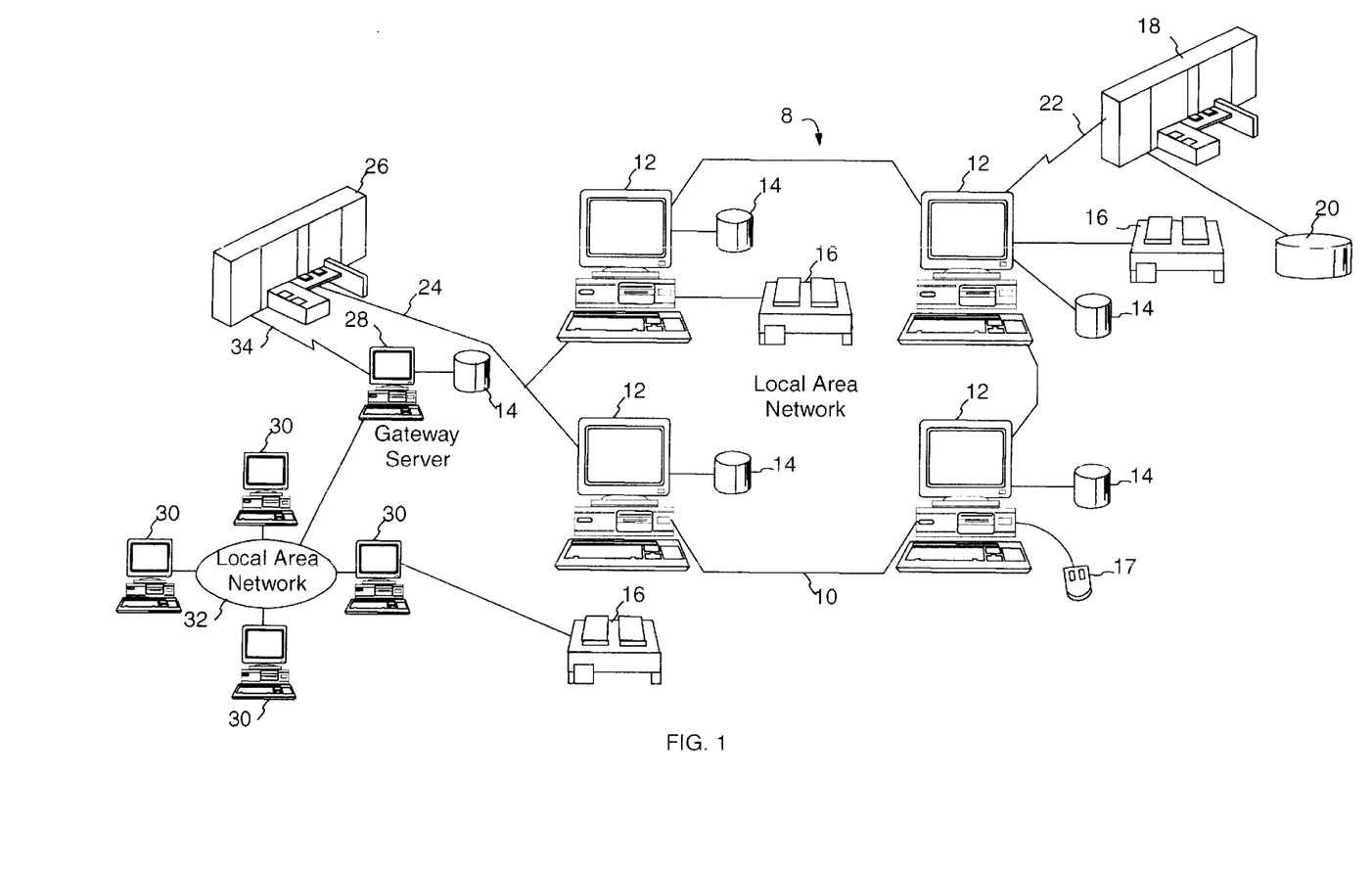
FIG. 1 is a pictorial representation of a data processing system which may be utilized to implement a method and system of the present invention.

Referring to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network. Each said network may also consist of a plurality of processors coupled via a communications medium, such as shared memory, shared storage, or an interconnection network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

Figure 2:
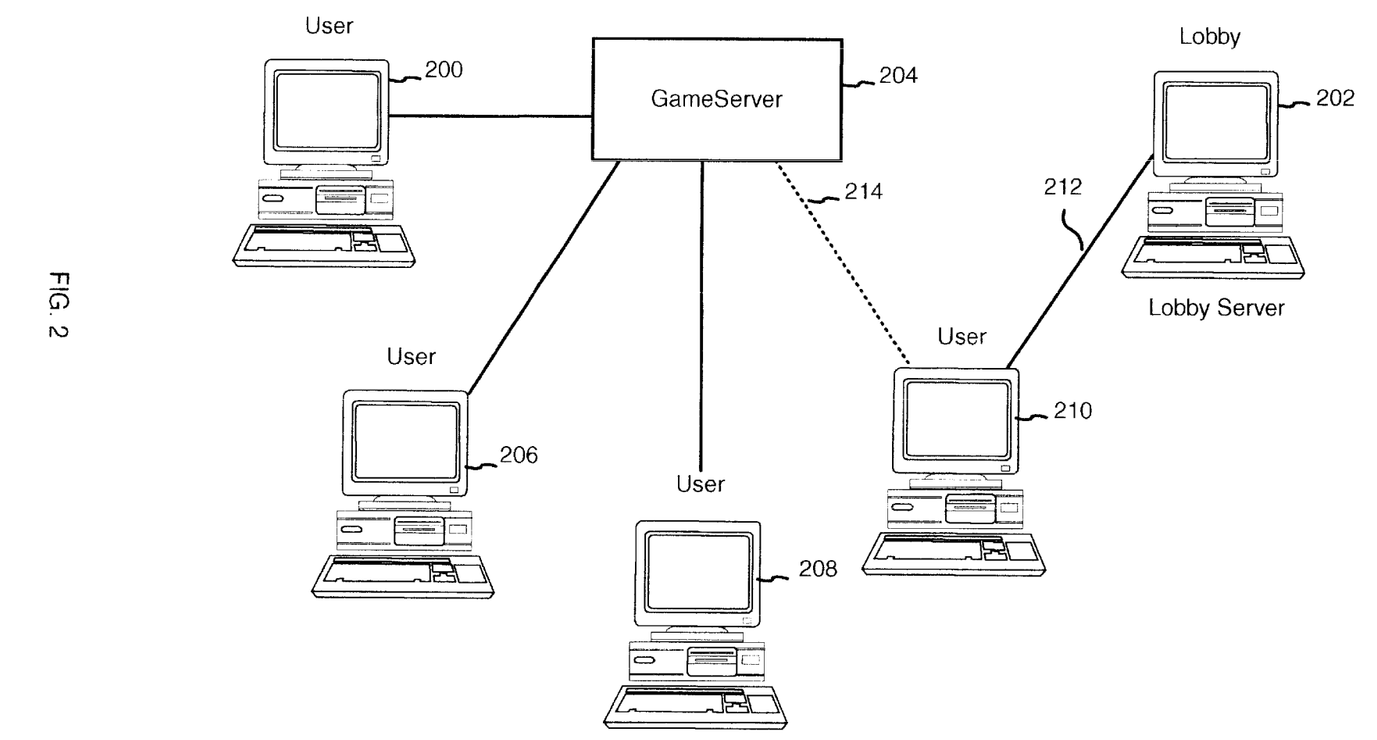
FIG. 2 illustrates a Multi-User Game environment.

Referring to FIG. 2, there is depicted a multi-user game environment. A multi-user game has been established by a User 200. The game is registered in a Lobby 202. Other users join the game by connecting to a GameServer 204. Two additional Users 206 and 208 are currently joined to the game created by the User 200 via GameServer 204. A new User 210 contacts the LobbyServer 202, as indicated by line 212, to find out what games are available and to retrieve the network addresses for their respective GameServers, and then the user can select and join the desired game, as indicated by dotted line connection 214 to GameServer 204.

Figure 3:
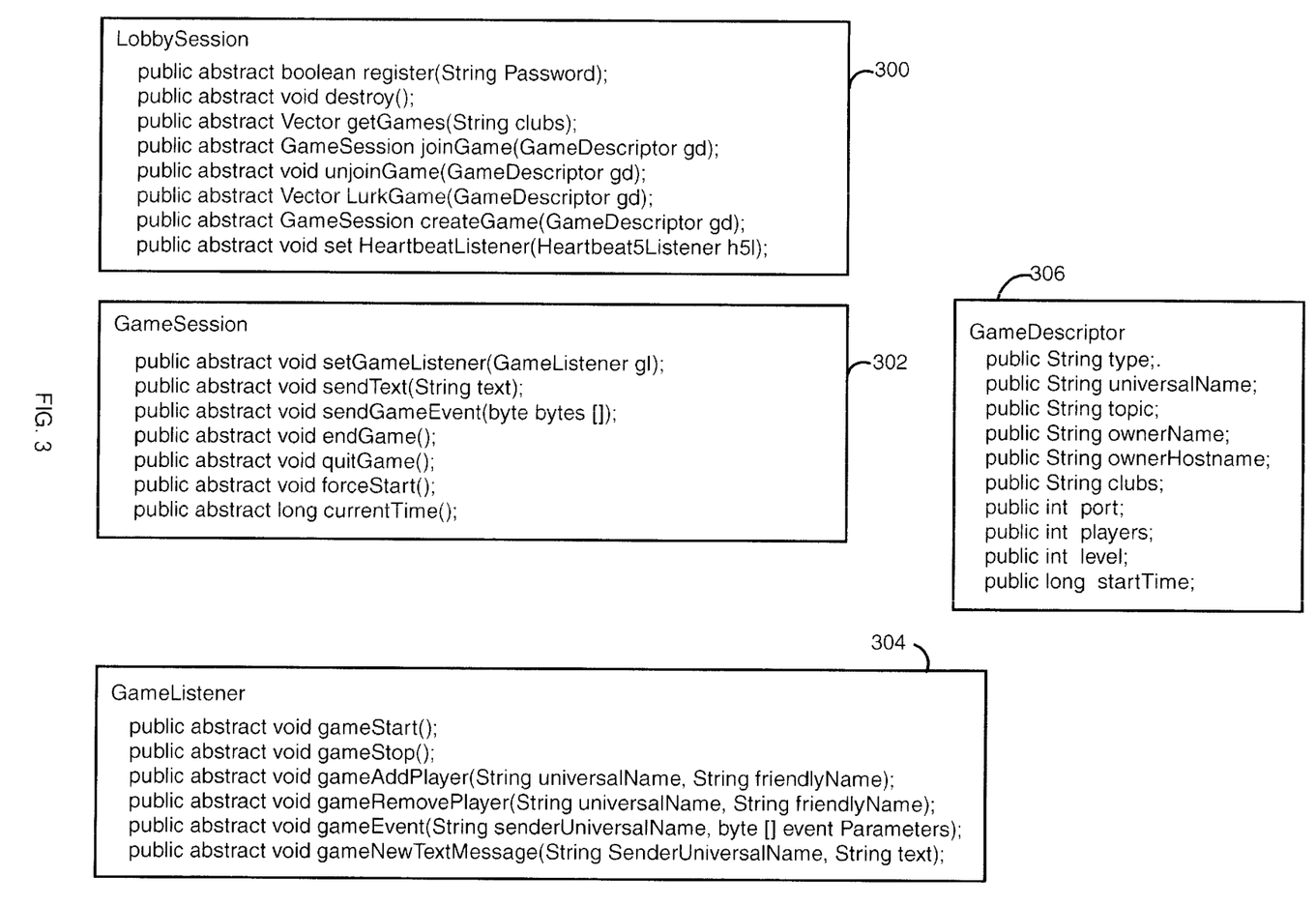
FIG. 3 illustrates interface support objects for Gaming in accordance with the present invention.

FIG. 3 illustrates the interface support objects for the game developer in accordance with the present invention. The objects are: LobbySession 300, GameSession 302, GameListener 304 and GameDescription 306. These four objects encapsulate the underlying process of creating a game, posting the created game to a lobby, and enabling the game to be joined by users. Only four objects are required and thus disclosed to the game developer to facilitate a multi-user game and entry via a Lobby. This is in contrast to a relatively large Application Programming Interface API required by the prior art.

Figure 4:
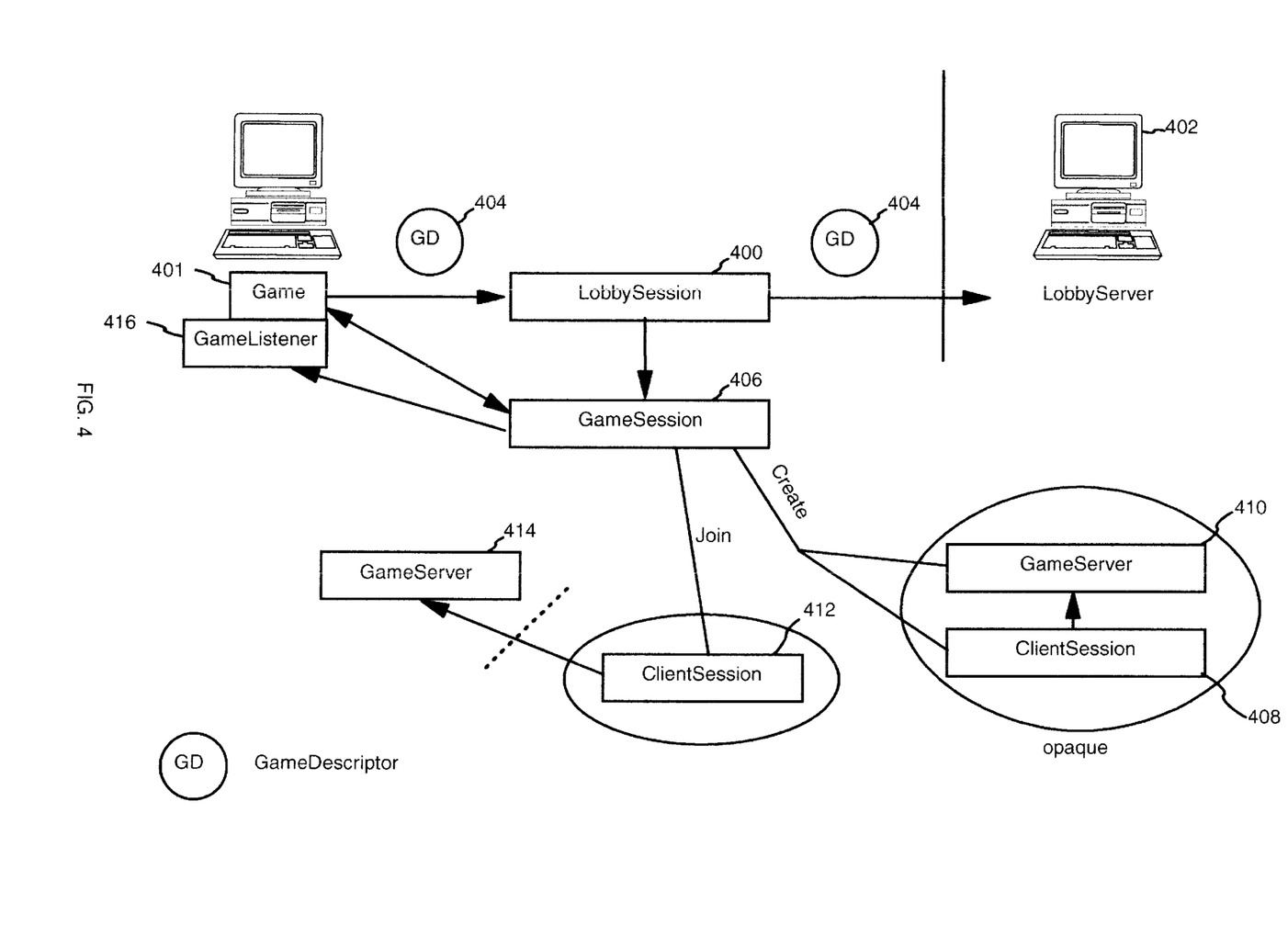
FIG. 4 illustrates an example of the underlying architecture of objects in accordance with the present invention.

Referring to FIG. 4, a Game application 401 uses a LobbySession 400 to communicate to a Lobby Server 402 which manages games that are available to join and games that are to be created. The GameDescriptor (GD) 404 is used by all objects for uniformity to disseminate game information. From the LobbySession 400 a GameSession object 406 can be created and returned to the Game application 401 to facilitate communication among the players of a particular game. This GameSession object 406 has an opaque data model which allows support for creating games and joining games. When a game is created, the GameSession object 406 will create a GameServer 410 to manage the game and will also create a ClientSession 408 to connect to that GameServer for joining the game on behalf of the game creator. When a game is joined, the GameSession object 406 will only create a ClientSession 412 that connects to an existing (and typically remote) GameServer 414 on behalf of the joining user. In other words, joining a game creates a ClientSession 408 and creating a game creates a ClientSession 408 and a GameServer 410. During the Game, application 401 may subsequently control the game by invoking methods on GameSession 406. It receives notifications about game events through the GameListener object 416, supplied by the Game application 401.

Figure 5:
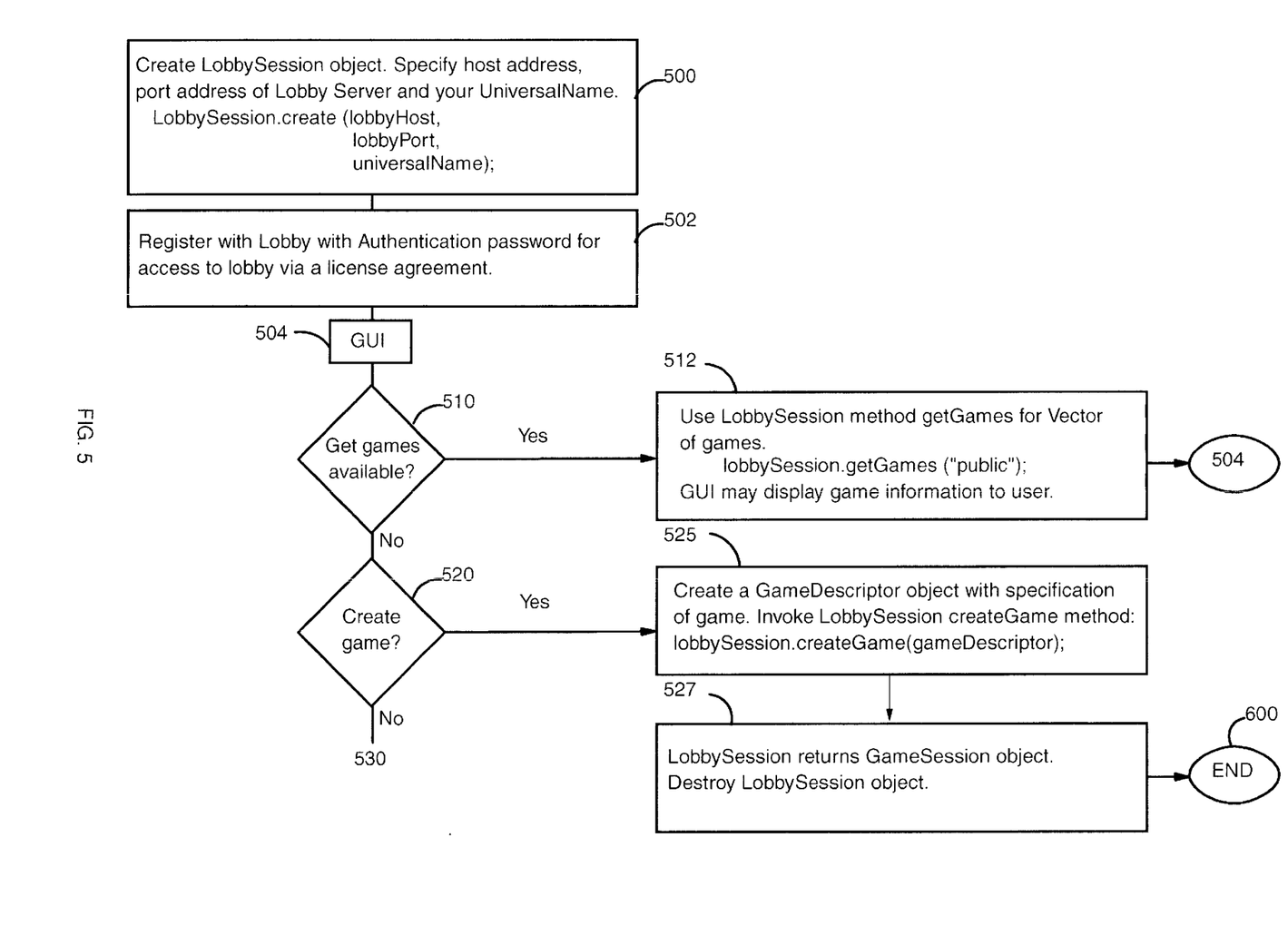
FIG. 5 illustrates a flowchart for facilitating multi-user gaming in accordance with the present invention.

Referring to FIG. 5, a flow chart illustrates the present invention. For a game developer to support a lobby environment for a multi-user game, a LobbySession object is created at block 500. The game developer must specify the network address or location for the Lobby Server (this Lobby Server network address may be obtained by a variety of well-known methods and, therefore, will not be discussed herein). The LobbySession provides a registration method for authentication with the server at block 502. Although not shown in FIG. 5, it is to be understood that without a proper authentication, the Lobby services may not be available to that user. A graphical user interface (GUI) is provided to the user at block 504 to allow ease of use. It is then determined at decision block 510 whether the user has made a request to get a list of available games. If the response to decision block 510 is yes, the present invention uses a LobbySession method "getGames" (see FIG. 3) to obtain a Vector to the games at block 512. The present invention then returns to the GUI at block 504.

If the response to decision block 510 is no, it is determined at decision block 520 whether or not a user wants to create a game. If the response to decision block 520 is yes, a GameDescriptor object is created with a game specification and passed to the LobbySession "createGame" method (see FIG. 3) at block 525. The LobbySession returns a GameSession object and destroys the LobbySession object previously created at block 500. The present invention then ends at 600.

If the response to decision block 520 is no, it is determined at decision block 530 whether or not a user wants to join a game. If the response to decision block 530 is yes, a GameDescriptor object is created with a specification of the Game's name and passed to the LobbySession "joinGame" method (see FIG. 3) at block 535. The LobbySession then returns a GameSession object and destroys, at block 537, the LobbySession object previously created at block 500. The present invention then ends at 600.

If the response to decision block 530 is no, it is determined at decision block 540 whether or not a user wants to "lurk" a game (meaning that the user does not want to join a game yet, but rather wants to see who is currently registered to play the game). If the response to decision block 540 is yes, a GameDescriptor object is created with a specification of the Game's name for the LobbySession "lurkGame" method (see FIG. 3) at block 545, which returns a Vector listing the players currently registered in the specified game. After block 545 or if the response to decision block 540 is no, the present invention returns to the GUI at block 504.

Figure 6:
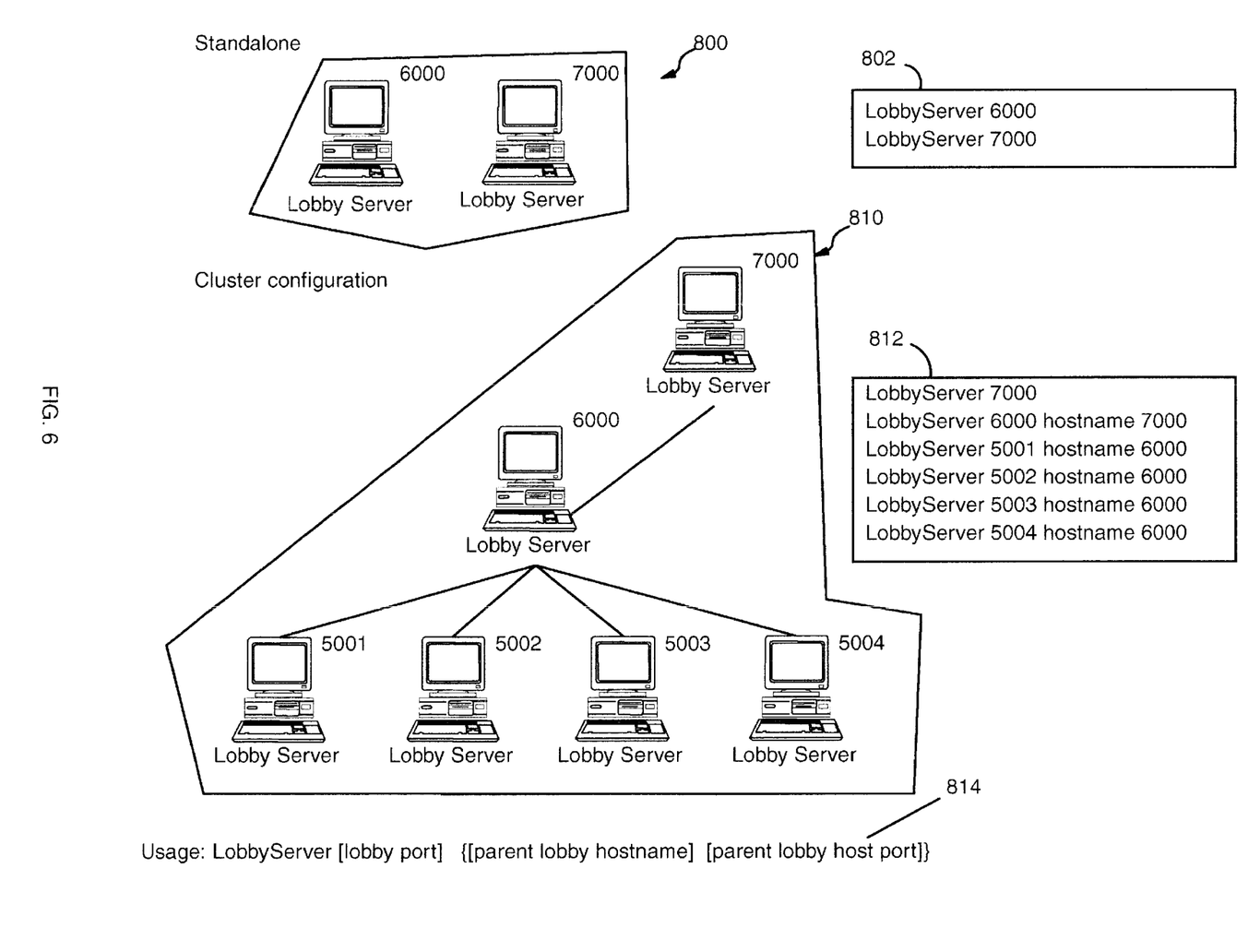
FIG. 6 is a flowchart illustrating the starting of a Lobby Server in accordance with the present invention.

Referring to FIG. 6, The Lobby Server can be started as a plurality of standalone servers, generally identified by reference numeral 800, or in a recursive cluster configuration, generally identified by reference numeral 810, through the sample parameter specifications 802 or 812, respectively. The syntax of this parameter specification is described by a usage message 814. Any Lobby Server that is started can be used by a LobbySession, and clustering and data replication is performed, whether running standalone or running as part of a cluster, transparently. Therefore, the design as taught herein of using four objects (see FIG. 3) does not restrict the ability of the process to utilize clustering as opposed to standalone configurations.

Although the present invention has been described with respect to a specific preferred embodiment thereof, various changes and modifications may be suggested to one skilled in the art and it is intended that the present invention encompass such changes and modifications as fall within the scope of the appended claims.

What is claimed is:

1. A method of providing a network interface in a data processing system to connect multiple users for a multi-user game, comprising the steps of:

using a LobbySession object to encapsulate access to a Lobby Server;

using said LobbySession object to retrieve a list of available games registered with the Lobby Server; and using said LobbySession object to return a common GameSession object in response to both a user requesting to register a game with the LobbySession, or requesting to join a registered game.

2. The method of claim 1, further comprising the step of:
using said LobbySession object to register a new game with the Lobby Server.

3. The method of claim 1, further comprising the step of:
using said LobbySession object to join an existing game.

4. The method of claim 1, further comprising the step of:
using said LobbySession object to lurk an existing game.

5. The method of claim 1, further comprising the step of:
configuring said Lobby Server to run as part of a cluster of Lobby Servers.

6. The method of claim 5, wherein said LobbySession selects a Lobby Server from among those available in said cluster.

7. A system for providing a network interface in a data processing system to connect multiple users for a multi-user game, comprising:
means for using a LobbySession object to encapsulate access to a Lobby Server;
means for using said LobbySession object to retrieve a list of available games registered with the Lobby Server; and
means for using said LobbySession object to return a common GameSession object in response to both a user requesting to register a game with the LobbySession, or requesting to join a registered game.

8. The system of claim 7, further comprising:
means for using said LobbySession object to create a new game.

9. The system of claim 7, further comprising:
means for using said LobbySession object to join an existing game.

10. The system of claim 7, further comprising:
means for using said LobbySession object to lurk an existing game.

11. The system of claim 7, further comprising:
means for configuring said Lobby Server to run as part of a cluster Lobby Servers.

12. The system of claim 11, wherein said LobbySession object selects a Lobby Server from among those available in said cluster.

13. A computer program product recorded on computer readable medium for providing a network interface in a data processing system to connect multiple users for a multi-user game, comprising:
computer readable means for using a LobbySession object to encapsulate access to a Lobby Server;
computer readable means for using said LobbySession object to retrieve a list of available games registered with the Lobby Server; and
computer readable means for using said LobbySession object to return a common GameSession object in response to both a user requesting to register a game with the LobbySession, or requesting to join a registered game.

14. The program product of claim 13, further comprising:
computer readable means for using said LobbySession object to create a new game.

15. The program product of claim 13, further comprising:
computer readable means for using said LobbySession object to join an existing game.

16. The program product of claim 13, further comprising:
computer readable means for using said LobbySession object to lurk an existing game.

17. The program product of claim 13, further comprising:
computer readable means for configuring said Lobby Server to run as part of a cluster of Lobby Servers.

18. The program product of claim 17, wherein said LobbySession object selects a Lobby Server from among those available in said cluster.

* * * * *